Figure 1:
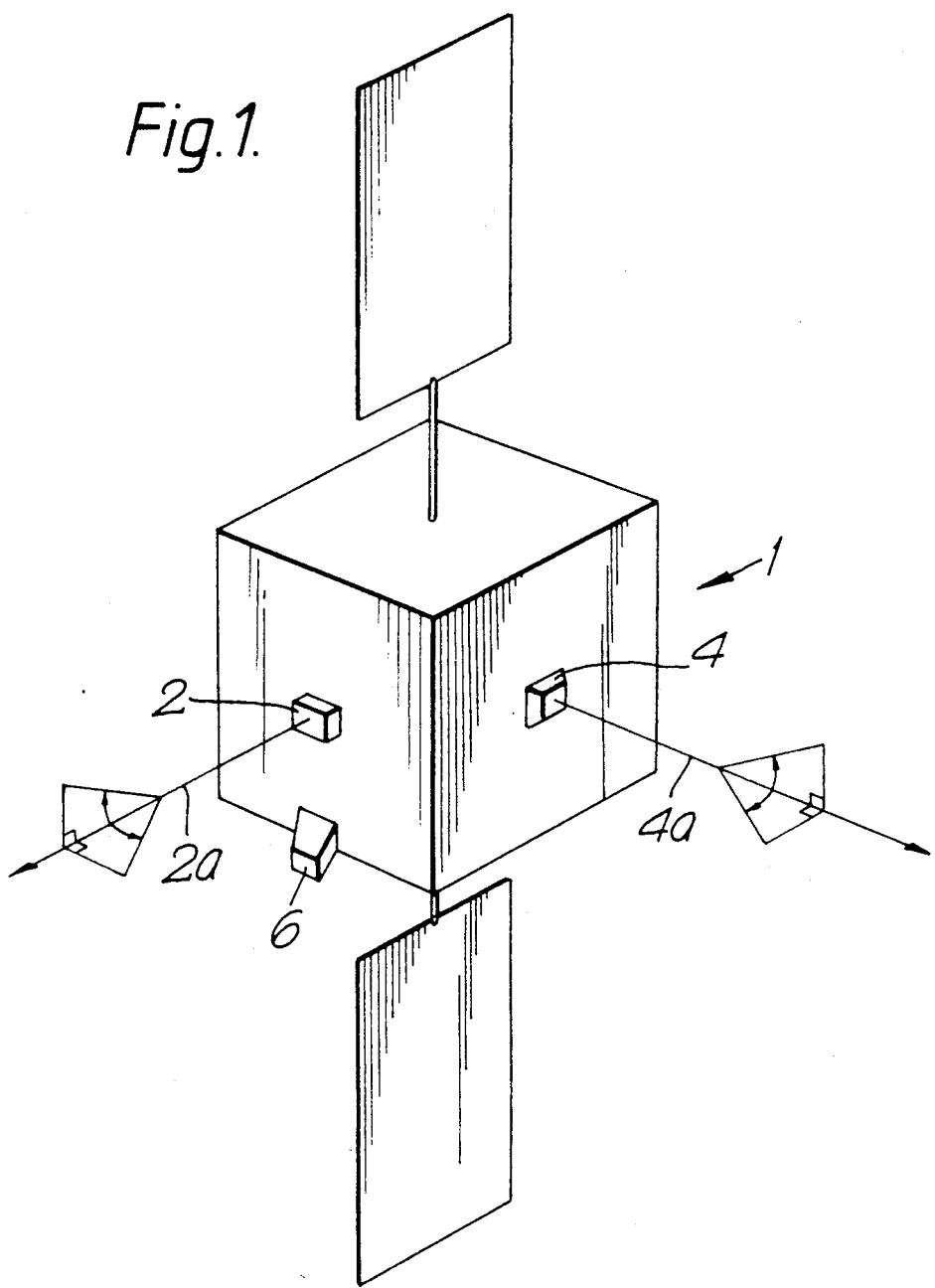

United States Patent [19]

Matthews

[11] Patent Number: 5,035,381
[45] Date of Patent: Jul. 30, 1991

[54] METHOD OF AND APPARATUS FOR RETURNING AN EARTH ORBITING SPACECRAFT TO AN EARTH POINTING ATTITUDE AFTER DISPLACEMENT THEREFROM

[75] Inventor: Nicholas Matthews, Plainsboro, N.J.

[73] Assignee: British Aerospace Public Limited Company, London, England

[21] Appl. No.: 331,322

[22] Filed: Mar. 31, 1989

[30] Foreign Application Priority Data

Apr. 20, 1988 [GB] United Kingdom ............... 8809247

[51] Int. Cl.⁵ .................. B64G 01/24; F41G 07/00
[52] U.S. Cl. .................... 244/164; 244/171; 244/003.210
[58] Field of Search ............. 244/3.21, 3.23, 164, 244/171, 165, 169, 170

[56] References Cited

U.S. PATENT DOCUMENTS 3,511,452  5/1970  Smith et al. ............... 244/165
3,765,621 10/1973  Shigehara ................. 244/166
4,071,211  1/1978  Muhlfelder et al. ......... 244/165

FOREIGN PATENT DOCUMENTS 267086  5/1988  European Pat. Off. ........... 244/171

Primary Examiner—Sherman Basinger
Assistant Examiner—Virna Lissi Mojica
Attorney, Agent, or Firm—Cushman, Darby & Cushman

[57] ABSTRACT

An Earth orbiting spacecraft (1) is returned to an Earth pointing attitude by means of a star sensor (6), Earth sensor (2), Sun sensor (4) and an angular momentum storage device. With the Sun sensor (4) locked on the Sun (5) the spacecraft is rotated until the star sensor (6) senses a predetermined brighter than magnitude 3 star such as Canopus (7). The angular momentum storage device is operated to preserve an attitude reference and the spacecraft (1) is further rotated by an angle α such that subsequent rotation around the angular momentum storage axis causes the Earth (3) to enter the view of the Earth sensor (2).

15 Claims, 3 Drawing Sheets

METHOD OF AND APPARATUS FOR RETURNING AN EARTH ORBITING SPACECRAFT TO AN EARTH POINTING ATTITUDE AFTER DISPLACEMENT THEREFROM

DISPLACEMENT THEREFROM

This invention relates to a method of and apparatus for returning an Earth orbiting spacecraft, such as for example a satellite, to an Earth pointing attitude after displacement therefrom.

Many spacecraft in orbit around the Earth require to maintain a fixed attitude with regard to the Earth. For example, communications or other artificial satellites usually broadcast to ground receivers using microwave links, which are very directional. For this reason, the spacecraft body to which the microwave payload is fixed must be maintained in an attitude pointing the microwave antenna towards the Earth. Usually this is achieved by a combination of sensors, electronics and actuators on board the spacecraft called the Attitude Control System (ACS). In particular, an Earth sensor is used to detect the spacecraft body's orientation with regard to the Earth.

It may happen that the spacecraft rotates away from its Earth pointing attitude due to a fault with the ACS or another part of the spacecraft, or because of an erroneous telecommand being sent to the spacecraft from its ground control station. Once the Earth is outside the field of view of the Earth sensor (which is typically approximately 20×20 degrees), the ACS may have no knowledge at all of where the Earth is. To acquire the nominal attitude a search for the Earth must be performed.

While a spacecraft Earth sensor is of very limited field of view, a Sun acquisition sensor having a hemispherical range is quite practical. By carrying two of these, a spacecraft can be almost certain of detecting the Sun whatever the spacecraft's attitude.

The usual conventional procedure for a spacecraft with two Sun sensors if the Earth is lost is for the spacecraft to assume a Sun pointing attitude, that is with the Sun on the boresight of one of the Sun acquisition sensors. Let the angle between the Sun sensor boresight and the Earth sensor boresight be A. At two times each day, as the spacecraft passes around its orbit the angle subtended at the spacecraft between the Sun and the Earth will be A. If at one of these times the spacecraft body is made to rotate round its Sun pointing axis, the Earth will enter the field of view of the Earth sensor.

The ACS can now hold the spacecraft such that the Earth remains in the Earth sensor field of view. Since the Sun can still be seen, the spacecraft's attitude is known completely and so the nominal attitude can be recovered.

If the times at which Earth search is possible are twelve hours apart, it will be necessary to wait in Sun pointing mode for up to twelve hours for the next such Sun/Earth orientation. This would be the case if the Earth were lost just after this geometry occurred.

There is thus a need for a generally improved method of and apparatus for recovery of normal Earth pointing attitude by a spacecraft after the Earth is lost from the Earth sensor field of view without needing to wait for a particular Sun/Spacecraft/Earth geometry. Hence a much more rapid recovery will be possible.

According to one aspect of the present invention there is provided a method of returning an Earth orbiting spacecraft to an Earth pointing attitude after displacement therefrom, utilising apparatus on the spacecraft which includes an Earth sensor, at least one Sun sensor having a boresight offset from the Earth sensor boresight, a star sensor having a boresight substantially at right angles to the Sun sensor boresight for sensing the position of a predetermined reference star, actuator means operable in response to the sensors to change the spacecraft attitude and an angular momentum storage device, which method includes the steps of maintaining the spacecraft in an attitude in which the Sun is on the Sun sensor boresight, rotating the spacecraft around the Sun sensor-Sun line until the predetermined reference star enters the view of the star sensor, operating the angular momentum storage device to accumulate angular momentum sufficient to preserve an attitude reference, further rotating the spacecraft around the Sun sensor-Sun line by an angle $\alpha$ computed from astronomical tables in dependence upon the time of day and time of year, such that a subsequent rotation of the spacecraft around the angular momentum storage axis causes the Earth to enter the view of the Earth sensor, releasing the spacecraft from alignment of the Sun sensor boresight on the Sun, and rotating the spacecraft about the angular momentum storage axis until the Earth enters the view of the Earth sensor.

Figure 1A:
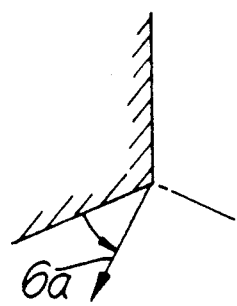
Figure 1B:
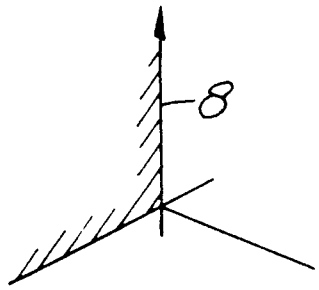
Figure 2:
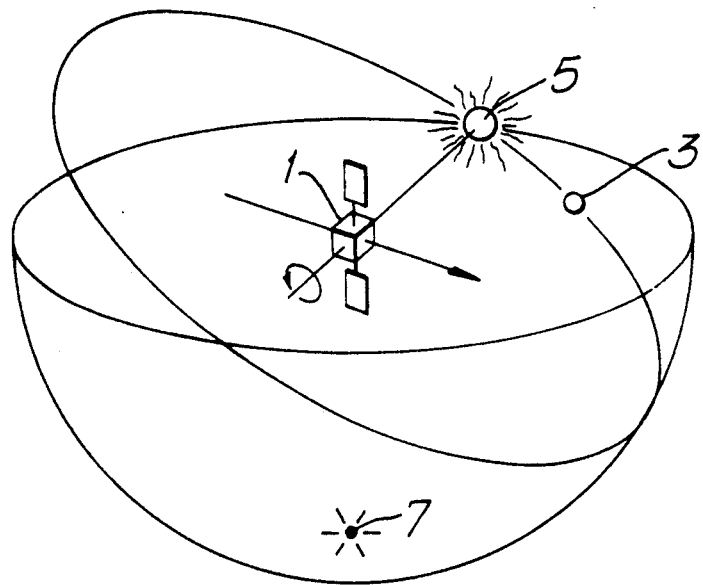
Figure 3:
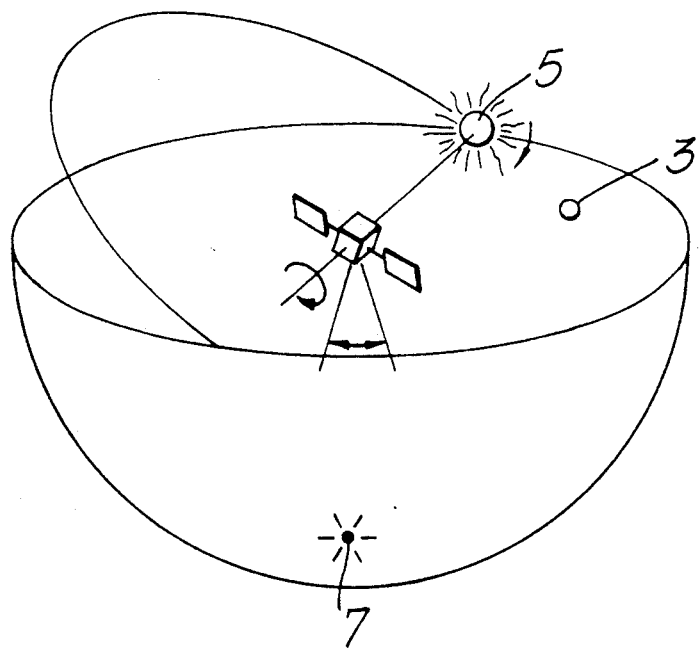
Figure 4:
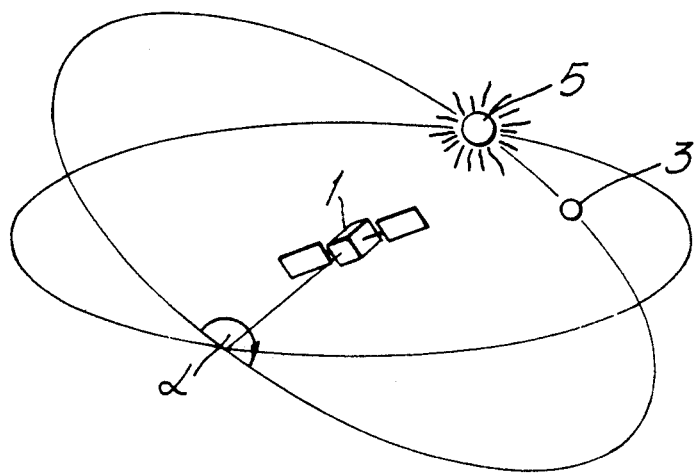
Figure 5:
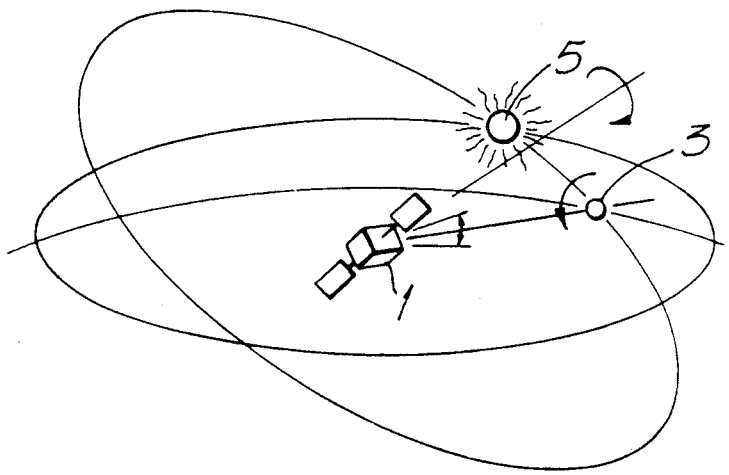
Figure 6:
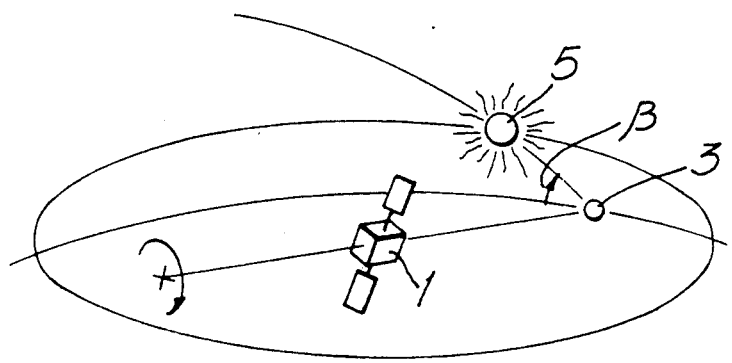

For a better understanding of the present invention, and to show how the same may be carried into effect, reference will now be made, by way of example, to the accompanying drawings, in which:

FIG. 1 is a diagrammatic perspective view of a spacecraft fitted with returning apparatus according to one embodiment of the present invention, FIG. 1A shows a star sensor boresight plane for the spacecraft of FIG. 1, FIG. 1B shows an angular momentum storage plane for the spacecraft of FIG. 1, FIG. 2 shows schematically a first stage of a method according to the present invention for returning an Earth orbiting spacecraft to an Earth pointing attitude in which the spacecraft is in a Sun pointing attitude, FIG. 3 is a view similar to that of FIG. 2 showing a second stage of the method in which a predetermined reference star is located, FIG. 4 is a view similar to those of FIGS. 2 and 3 showing a third stage of the method in which an Earth search attitude is adopted, FIG. 5 is a view similar to those of FIGS. 2 to 4 showing a fourth stage of the method in which the Earth sensor is brought into line with the Earth, and FIG. 6 is a view similar to those of FIGS. 2 to 5 showing a further stage of the method in which the spacecraft is brought into a nominal Earth pointing attitude.

As shown in FIG. 1 of the accompanying drawings an apparatus of the present invention for returning an Earth orbiting spacecraft, such as a communications satellite 1, to an Earth pointing attitude includes an Earth sensor 2 measuring the direction and position of the Earth 3 about two orthogonal axes. At least one Sun sensor 4 is provided whose boresight is offset from the boresight 2a of the Earth sensor 2 by an angle in the range of from 30° to 150°, preferably substantially 90°. The sensor 4 senses and measures the direction and position of the Sun 5 in two orthogonal axes. Sufficient sensors 4 to achieve as near spherical field of view are preferable.

A star sensor 6 is provided whose boresight 6a (see FIG. 1A) is mounted substantially at right angles to that of the Sun sensor 4. The star sensor 6 is operable to sense, identify and measure in two axes a predetermined reference star which is brighter than Magnitude 3, such as Canopus 7. This star is used because of its position near the ecliptic South Pole and because it is very bright.

The apparatus also includes actuator means capable of changing the spacecraft attitude in three axes, for example, reaction wheels, momentum wheels, magnetorques or thrusters. Also provided is an angular momentum storage device such as an actuator or combination of actuators capable of storing significant angular momentum, such as a momentum wheel, in a direction substantially at right angles to the Sun sensor boresight 4a, and aligned with a principal axis of the spacecraft, as shown at 8 in FIG. 1B. Means, preferably electronic, are provided to process the Earth sensor output indicative of the sensed Earth position and to control the actuators in order to maintain the Earth 3 on the Earth sensor boresight 2a.

Means, also preferably electronic, are provided to process the Sun sensor output indicative of the sensed Sun position and to control the actuators in order to maintain the Sun 5 on the Sun sensor boresight 4a.

The method of the invention for returning the satellite 1 to an Earth pointing direction can be achieved with the hereinbefore described apparatus, with additional actions performed by the spacecraft's ground control station. Alternatively, additional electronics might be included on board to step through the sequence, and to perform an attitude lock on Canopus.

An attitude recovery is performed as follows:

i Initially the spacecraft 1 is in a Sun pointing attitude with the Sun 5 on the boresight 4a of the Sun sensor 4 (FIG. 2) and with two control loops maintaining the Sun 5 in this position.

ii The spacecraft 1 is made to rotate around the Sun sensor-Sun line until Canopus 7 enters the field of view of the star sensor 6, when the rotation is stopped (FIG. 3).

iii In general, depending on the time of day, the Earth 3 will not be in the field of view of the Earth sensor 2 and must be searched for. Because it may not be possible to view Canopus 7 and the Sun 5 simultaneously while searching for the Earth 3 it is necessary to preserve an attitude reference. This is achieved by using the momentum storage device to accumulate significant angular momentum.

iv The spacecraft 1 is now rotated further around the Sun direction by an angle $\alpha$ such that a subsequent rotation around the angular momentum storage axis 8 will cause the Earth 3 to enter the Earth sensor field of view (see FIG. 4). Angle $\alpha$ is uniquely determined by the time of day and the time of year and can be computed with reference to astronomical tables. This rotation is in fact a precession of the angular momentum vector. It may be achieved by firing a pair of equal thruster pulses about the axis at right angles to the angular momentum storage axis and the Sun direction.

v After the precession any residual nutation (that is motion due to the total angular momentum vector not being aligned with the storage axis 8) is damped using a method which has no net external angular impulse. For example, an on-board passive damper or pairs of equal and opposite thruster pulses occur half a nutation period apart.

vi The control loops which have been maintaining the Sun sensor boresight 4a on the Sun 5 are now deactivated and a rotation about the angular momentum storage axis 8 is caused (see FIG. 5). This could be by firing thrusters or simply by altering the momentum in the storage device. In order to conserve angular momentum the spacecraft 1 will rotate about the storage axis 8.

vii This rotation will cause the Earth sensor field of view to sweep across the Earth 3. By timing the interval between successive Earth crossings, the exact sweep rate can be measured. The sweep rate is then reduced in anticipation of an Earth crossing to within the capabilities of the control loops or means which control the spacecraft attitude using the Earth sensor 3. These are used to finally halt the rotation about the angular momentum axis 8 to maintain the spacecraft 1 in a constant attitude with regard to the Earth 3.

viii Depending on the time of day, the angular momentum axis will not necessarily be in the correct orientation required for the nominal attitude. In other words, the attitude around the spacecraft Earth direction is not yet nominal. To correct this, the angular momentum vector is precessed by an angle $\beta$ around the Earth direction to the nominal orientation, typically using thrusters (see FIG. 6). The Sun sensor output is used to measure the orientation round the Earth direction. Angle $\beta$ is uniquely determined by the time of day and time of year.

I claim:

1. A method of returning an Earth orbiting spacecraft to an Earth pointing attitude after displacement therefrom, utilizing apparatus on the spacecraft which includes an Earth sensor which has a boresight, at least one Sun sensor having a boresight offset from the Earth sensor boresight, a star sensor having a boresight substantially at right angles to the Sun sensor boresight for sensing the position of a predetermined reference star, actuator means operable in response to the sensors to change the spacecraft attitude and an angular momentum storage device which has an angular momentum storage axis in a direction having an angle in the range of 30 to 150 degrees to the Sun sensor boresight and aligned with a principle axis of the spacecraft, which method includes the steps of maintaining the spacecraft in an attitude in which the Sun is on the Sun sensor boresight, rotating the spacecraft around a Sun sensor-Sun line until the predetermined reference star enters the view of the star sensor, operating the angular momentum storage device to accumulate angular momentum sufficient to preserve an attitude reference, further rotating the spacecraft around the Sun sensor-Sun line by an angle $\alpha$ computed from astronomical tables in dependence upon the time of day and time of year, such that a subsequent rotation of the spacecraft around the angular momentum storage axis causes the Earth to enter the view of the Earth sensor, releasing the spacecraft from alignment of the Sun sensor boresight on the Sun, and rotating the spacecraft about the angular momentum storage axis until the Earth enters the view of the Earth sensor.

2. A method according to claim 1, in which the predetermined reference star sought by the star sensor is Canopus.

3. A method according to claim 1 or 2, in which after the spacecraft is rotated around the Sun sensor-Sun line by the angle α any residual motion due to a total angular momentum vector not being aligned with the angular momentum storage axis is damped in a manner without any net external angular impulse.

4. A method according to claim 3, in which if, after the Earth has entered the view of the Earth sensor, it is necessary to correct the attitude around the spacecraft-Earth direction to nominal, the angular momentum vector is precessed by an angle β around the Earth sensor-Earth line to the nominal orientation, which angle β is computed in dependence upon the time of day and the time of year.

5. Apparatus for returning an Earth orbiting spacecraft to an Earth pointing attitude after displacement therefrom, which apparatus includes an Earth sensor having a boresight for sensing the position of the Earth relative to the spacecraft and capable of producing an output signal indicative of the Earth position, at least one Sun sensor, having a boresight offset from the Earth sensor boresight, for sensing the position of the Sun relative to the spacecraft and capable of producing an output signal indicative of the Sun position, a star sensor, having a boresight substantially at right angles to the boresight of the Sun sensor, for sensing a position of a predetermined reference star and capable of producing an output signal indicative of the position of the reference star, actuator means for changing the spacecraft attitude, an angular momentum storage device which has an angular momentum storage axis in a direction having an angle in the range of 30 to 150 degrees to the Sun sensor boresight and aligned with a principle axis of the spacecraft, and control means for processing the output signals of the Earth sensor, Sun sensor and star sensor and operating the actuator means to change the spacecraft attitude accordingly.

6. Apparatus according to claim 5, wherein the Earth sensor is operable to measure the direction of the Earth about two orthogonal axes.

7. Apparatus according to claim 6, wherein the Sun sensor is operable to measure the direction of the Sun about two orthogonal axes.

8. Apparatus according to claim 7, wherein the Sun sensor boresight is offset from the Earth sensor boresight by an angle in the range of 30° to 150°.

9. Apparatus according to claim 8, wherein the Sun sensor boresight is offset from the Earth sensor boresight by substantially 90°.

10. Apparatus according to claim 9, wherein the star sensor is operable to sense the position of a predetermined reference star which is brighter than magnitude 3.

11. Apparatus according to claim 10, wherein the predetermined reference star whose position is sensed by the star sensor is Canopus.

12. Apparatus according to claim 11, wherein the angular momentum storage device is capable of storing angular momentum in a direction substantially at right angles to the Sun sensor boresight, and in operation of the apparatus, is aligned with a principal axis of the spacecraft.

13. Apparatus according to claim 12, wherein the control means includes means for processing the output signal of the Earth sensor and operating the actuator means to maintain the Earth on the Earth sensor boresight.

14. Apparatus according to claim 13, wherein the control means includes means for processing the Sun sensor output and operating the actuator means to maintain the Sun on the Sun sensor boresight.

15. A spacecraft having an apparatus according to claim 5.

* * * * *